United States Patent
Allen et al.

(10) Patent No.: US 9,523,247 B1
(45) Date of Patent: Dec. 20, 2016

(54) SPACED VIV SUPPRESSION SYSTEM

(71) Applicant: VIV Solutions LLC, Richmond, TX (US)

(72) Inventors: Donald Wayne Allen, Richmond, TX (US); Jeffrey Robert Dupuis, Houston, TX (US); Julie Ann Dehne, Cypress, TX (US)

(73) Assignee: VIV SOLUTIONS LLC, Richmond, TX (US)

( * ) Notice: Subject to any disclaimer, the term of this patent is extended or adjusted under 35 U.S.C. 154(b) by 325 days.

(21) Appl. No.: 14/195,460

(22) Filed: Mar. 3, 2014

Related U.S. Application Data (60) Provisional application No. 61/772,620, filed on Mar. 5, 2013.

(51) Int. Cl.
*E02D 5/60* (2006.01)
*E02D 31/00* (2006.01)
*E21B 17/10* (2006.01)

(52) U.S. Cl.
CPC ....... *E21B 17/1078* (2013.01); *E21B 17/1085* (2013.01)

(58) Field of Classification Search
CPC ............. B63B 2021/504; B63B 21/502; B63B 21/633; E21B 17/01; E21B 17/1035; E21B 17/1078; E21B 17/1085
USPC .................................. 405/211–216; 114/243
See application file for complete search history.

(56) References Cited

U.S. PATENT DOCUMENTS

| | | | | |
|---|---|---|---|---|
| 4,398,487 A | * | 8/1983 | Ortloff | B63B 1/32 114/243 |
| 5,722,340 A | * | 3/1998 | Sweetman | F15D 1/10 114/243 |
| 6,669,408 B1 | * | 12/2003 | Woodall | F15D 1/12 114/243 |
| 7,070,361 B2 | * | 7/2006 | McMillan | F15D 1/10 114/243 |
| 8,770,894 B1 | * | 7/2014 | Allen | F15D 1/10 405/211.1 |
| 2003/0141070 A1 | * | 7/2003 | Davies | E21B 17/012 166/350 |
| 2006/0153642 A1 | * | 7/2006 | Esselbrugge | B63B 21/502 405/216 |
| 2008/0025800 A1 | * | 1/2008 | Watkins | B63B 21/502 405/216 |
| 2010/0307762 A1 | * | 12/2010 | Howard | F16F 15/00 166/350 |

FOREIGN PATENT DOCUMENTS

GB 2044320 A * 10/1980 ......... E21B 17/1035
WO WO 2009094355 A1 * 7/2009 ........... B63B 21/502

* cited by examiner

*Primary Examiner* — John Kreck
*Assistant Examiner* — Stacy Warren
(74) *Attorney, Agent, or Firm* — Blakely Sokoloff Taylor & Zafman LLP (57) ABSTRACT

An apparatus, system and method capable of spacing a vortex induced vibration (VIV) suppression device from a tubular. The apparatus, system and method including a collar capable of facilitating suppression of VIV of a high temperature tubular; suppressing VIV of multiple tubulars covered by a single suppression device; or allowing for functioning of the tubular cathodic protection system.

19 Claims, 11 Drawing Sheets

SPACED VIV SUPPRESSION SYSTEM

CROSS-REFERENCE TO RELATED APPLICATION

The application is a non-provisional application of co-pending U.S. Provisional Patent Application No. 61/772,620, filed Mar. 5, 2013 and incorporated herein by reference.

FIELD

A collar for forming a space between a vortex induced vibration (VIV) suppression device and a tubular is disclosed, more specifically a collar capable of facilitating suppression of VIV of a high temperature tubular; suppressing VIV of multiple tubulars covered by a single suppression device; and/or allowing for functioning of the tubular cathodic protection system. Other embodiments are also described herein.

BACKGROUND

A difficult obstacle associated with the exploration and production of oil and gas is management of significant ocean currents. These currents can produce vortex induced vibration (VIV) and/or large deflections of tubulars associated with drilling and production. VIV can cause substantial fatigue damage to the tubular or cause suspension of drilling due to increased deflections. Both helical strakes and fairings can provide sufficient VIV suppression, but can be slow and unsafe to install.

Most suppression devices are placed against the tubular. For example, helical strakes are typically clamped to the tubular, though in some cases the helical strake may have a spacer element to allow water flow under the strake for cathodic protection. Fairings typically have a small annulus between the fairing and the tubular, but are held in the same axial position by collars that are clamped to the tubular.

Some tubulars may have a high surface temperature. Since most VIV suppression devices are made of common plastic, the high tubular surface temperature can melt the plastic. For example, a helical strake with or without a spacer will have the helical strake body or the spacer material contact the outer surface of the tubular. The helical strake or typical spacer material (the spacer may even be molded into the helical strake body) can melt from contact with the tubular. Similarly, while most collars (which are positioned at the ends of fairings and are used to keep fairings from sliding axially along the tubular) are made of a material that can withstand higher temperatures than helical strake or fairing bodies, most collars may melt due to the tubular temperature and the high water temperature in the annulus can cause a fairing to deform.

Another problem encountered by VIV suppression systems is the need to suppress more than one tubular in close proximity. This can be difficult since, if each tubular is suppressed separately, then the suppression devices for each tubular may interfere with each other. For example, the fairings on one tubular may contact fairings on an adjacent tubular and keep both fairings from weathervaning into the correct position. Also, simply placing a VIV suppression device around both tubulars may cause excessive stresses on one of the tubulars or on the VIV suppression device if the tubulars are allowed to move relative to each other.

It is also possible to have two tubulars in close proximity with one of the tubulars having a temperature sufficiently high to melt most common plastic materials.

Another problem is cathodic protection. Cathodic protection systems typically require water flow near the tubular surface. VIV suppression devices that incorporate elements that enclose tightly around the tubular (such as a helical strake) inhibit cathodic protection.

SUMMARY

In accordance with an embodiment of the invention, a VIV suppression device system is provided that can suppress VIV on a hot tubular without the use of expensive exotic materials, can suppress VIV of adjacent tubulars in close proximity, or both. In addition, the VIV suppression device may allow for cathodic protection systems to function by allowing for water flow between the device and the tubular.

Representatively, in one embodiment, a collar for forming a space between a vortex induced vibration (VIV) suppression device and a tubular is disclosed. The collar may include a cylindrical body portion dimensioned to encircle a tubular, the cylindrical body portion having a top end and a bottom end. A spacer member may extend radially outward from the top end or the bottom end of the cylindrical body portion. The spacer member may be dimensioned to form a space between a tubular encircled by the cylindrical body portion and a VIV suppression device positioned around the tubular.

In another embodiment, a system for forming a space between a vortex induced vibration (VIV) suppression device and a tubular is disclosed. The system may include a collar having a cylindrical body portion forming a first opening dimensioned to receive a first tubular and a ring member formed around the cylindrical body portion, the ring member having a surface extending radially outward from the cylindrical body portion, and a second opening dimensioned to receive a second tubular is formed through the surface. The system may further include a VIV suppression device positioned around the collar, wherein an outer edge of the surface is dimensioned to contact and space an inner surface of the VIV suppression device a distance from a first tubular and a second tubular.

In another embodiment, a method of spacing a VIV suppression device from a tubular is disclosed. The method may include positioning a collar around a tubular, the collar having a cylindrical body portion and a ring member positioned around the cylindrical body portion. The method may further include positioning a VIV suppression device around the collar and the tubular such that the ring member of the collar contacts an inner surface of the VIV suppression device and forms a space between the VIV suppression device and the tubular.

The above summary does not include an exhaustive list of all aspects of the present invention. It is contemplated that the invention includes all apparatuses that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments disclosed herein are illustrated by way of example and not by way of limitation in the figures of the accompanying drawings in which like references indicate similar elements. It should be noted that references to "an"

or "one" embodiment in this disclosure are not necessarily to the same embodiment, and they mean at least one.

DETAILED DESCRIPTION

In this section we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

Figure 1A:
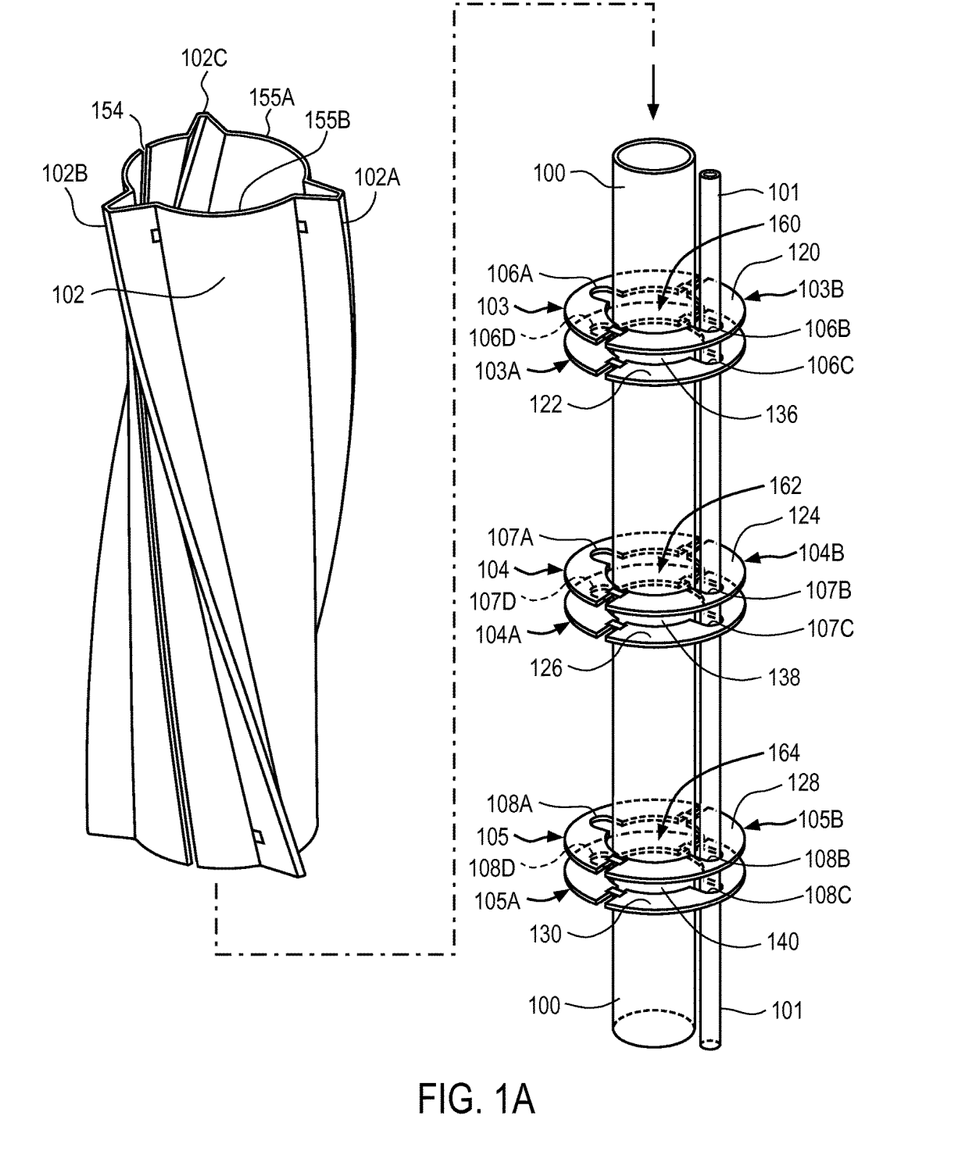
FIG. 1A is a perspective view of one embodiment of a collar for forming a space between a vortex induced vibration (VIV) suppression device and a tubular.

Referring now to the invention in more detail, FIG. 1A is a perspective view of one embodiment of a collar for forming a space between a vortex induced vibration (VIV) suppression device and a tubular. In this embodiment, the VIV device is a helical strake 102 that encircles collars 103, 104, and 105 that are, in turn, positioned around tubular 100. Tubular 101 is an adjacent tubular in close proximity to tubular 100. Helical strake 102 has three fins 102A, 102B, and 102C. In one embodiment, strake 102 may have a clam shell configuration in that it is formed by a first side 155A and a second side 155B that can be separated along an opening 154, formed along a side of strake 102 so that helical strake 102 can be placed around tubular 100. Alternatively, helical strake 102 may not include an opening and instead may have an inseparable tubular shell that is inserted over an end of tubular 100 and slid down tubular 100. In some embodiments, strake 102 may have an inner diameter substantially the same as or slightly larger than tubular 100 or other underlying structure such that it fits around the tubular 100 or other structure. In the illustrated embodiment, strake fins 102A-102C have a substantially triangular cross-sectional shape, however, other shapes may be suitable (e.g., circular, square, etc.). It is noted, however, that helical strake 102 may be of any geometry with any number, size, and shape of fins.

Helical strake 102 may be of any suitable length, but will typically be from about 4 feet to about 10 feet long. Strake fins 102A-102C may be of any suitable height but will typically range from about 5 to about 50 percent of the tubular diameter, with 20 to 30 percent being the most common height range. The pitch of strake fins 102A-102C may be of any suitable pitch, for example, within a range of from about 5 to about 25 times the tubular diameter, with 10-20 times the tubular diameter being most common. The number of fins may vary from about 1 to about 8, preferably from 3 to 4.

Collars 103, 104, and 105 may be positioned around tubular 100 and tubular 101. Each of collars 103, 104 and 105 may include a cylindrical body portion 136, 138 and 140, respectively, which define tubular openings 160, 162 and 164, respectively, so that collars 103, 104 and 105 can encircle and contact an outer surface of the tubular 100. Spacer members may in turn extend from the top end and the bottom end of each cylindrical body portion and be dimensioned to space helical strake 102 a distance from tubular 100. Representatively, collar 103 may include cylindrical body portion 136 having a top spacer member 120 extending from a top end of body portion 136 and a bottom spacer member 122 extending from a bottom end of body portion 136. Collar 104 may include cylindrical body portion 138 having a top spacer member 124 extending from the top end of body portion 138 and a bottom spacer member 126 extending from the bottom end of body portion 138. Collar 105 may include cylindrical body portion 140 having top spacer member 128 extending from the top end and bottom spacer member 130 extending from the bottom end of body portion 140. In some embodiments, spacer members 120, 122, 124, 126 and 128 may be substantially ring shaped structures which, along with their respective cylindrical body portions 136, 138 and 140, entirely encircle tubular 100.

Each of spacer members 120, 122, 124, 126 and 128 may further include openings which are dimensioned to receive the adjacent tubular 101. In this aspect, in addition to spacing helical strake 102 from tubular 100, they also space tubular 100 from tubular 101 and space tubular 101 from helical strake 102. Representatively, spacer member 120 may include opening 106A and opening 106B. Openings 106A and 106B may be diametrically opposed to one another. In addition, spacer member 122 may include openings 106C and 106D which are also diametrically opposed to one another. Openings 106A and 106D may be aligned one on top of the other and openings 106B and 106C may be aligned one on top of the other, as shown, such that they can receive different portions of tubular 101. Similarly, spacer member 124 of collar 104 may include opening 107A and opening 107B, which are diametrically opposed with one another. Spacer member 126 may include opening 107C and opening 107D. Openings 107B and 107C may be aligned one on top of the other and openings 107A and 107D may be aligned one on top of the other as shown such that they can receive different portions of tubular 101. In addition, spacer member 128 of collar 105 may include diametrically opposed openings 108A and 108B and spacer member 130 may include diametrically opposed openings 108C and 108D. The openings 108B and 108C of spacer member 128 may be aligned one on top of the other and openings 108A and 108D may be aligned one on top of the other such that they can receive different portions of tubular 101. It is to be understood that although each of the spacer members 120, 122, 124, 126, 128 and 130 are described as having two openings, a single opening or more than two openings may be positioned within spacer members 120, 122, 124, 126, 128 and 130 depending upon the number of tubulars 101 positioned adjacent to tubular 100, and within helical strake 102. In one embodiment, openings 106A-

106D, 107A-107D and 108A-108D are formed along an inner edge of the respective spacer member (i.e. the edge facing toward tubular 100) such that they have an open side facing toward tubular 100 within which tubular 101 can be inserted. In another embodiment, openings 106A-106D, 107A-107D and 108A-108D can be formed along an outer edge of the respective spacer member (i.e. the edge facing away from tubular 100) such that the open side, within which tubular 101 can be inserted, faces away from tubular 100 (see FIG. 1H). In still further embodiments, openings 106A-106D, 107A-107D and 108A-108D can be a combination of inwardly and outwardly facing openings. Alternatively, openings 106A-106D, 107A-107D and 108A-108D may be closed openings formed entirely within a respective spacer member such that they are slid over an end of tubular 101 to position tubular 101 therein.

Openings 106A-106D, 107A-107D and 108A-108D can have any size and shape sufficient to receive and stabilize a tubular (e.g. tubular 101) positioned between tubular 100 and strake 102. Representatively, openings 106A-106D, 107A-107D and 108A-108D can be "U" shaped slots having a depth and width sufficient to receive tubular 101 positioned between tubular 100 and strake 102. Said another way, openings 106A-106D, 107A-107D and 108A-108D can be "U" shaped slots having a curvature which conforms to an outer diameter of a tubular (e.g. tubular 101) around which it is to be positioned. Although "U" shaped openings (or slots) 106A-106D, 107A-107D and 108A-108D are shown and described herein, it is further contemplated that openings 106A-106D, 107A-107D and 108A-108D may have other shapes and sizes sufficient to receive and stabilize a tubular therein, for example, circular, rectangular or square shapes.

In some embodiments, each of collars 103, 104 and 105 may have two sections or halves that may be separated from one another to facilitate positioning of collars 103, 104 and 105 around tubular 100. Halves 103A and 103B may form collar 103, halves 104A and 104B may form collar 104, and halves 105A and 105B may form collar 105. Each of halves 103A-103B, 104A-104B and 105A-105B may be hinged to one another such that they can be opened or closed in a clam shell type configuration, or they may not be hinged together such that they can be completely separated from one another. In addition, in embodiments where collars 103, 104 and 105 are molded to strake 102, each of halves 103A-103B, 104A-104B and 105A-105B may be attached (e.g. molded) to one of side 155A or 155B of strake 102 such that when strake 102 is opened or closed along opening 154, collars 103, 104 and 105 are also opened or closed.

Still referring to FIG. 1A, each internal collar 103, 104, and 105 is clamped to tubular 100 by any suitable means. In some embodiments, each of collars 103, 104, and 105 may consist of a single part (instead of two halves as shown in FIG. 1A) and any number of collars may be used to support helical strake 102. A single collar may support more than one helical strake 102. Collars 103, 104, and 105 may have any number of optional openings 106A-106D, 107A-107D and 108A-108D to accommodate adjacent tubulars or other structures. In this manner, collars 103, 104, and 105 may be used to accommodate one adjacent tubular, two or more adjacent tubulars, or not accommodate any adjacent tubulars at all. Helical strake 102 may have any number of fins 102A-102C and may consist of a single piece or have multiple segments around tubular 100. Helical strake 102 may be attached to collars 103, 104, and 105 by any suitable means including, but not limited to, bands, fasteners, chemical bonding, or use of other clamping devices.

For applications where tubular 100 is heated, helical strake 102 will have a much lower temperature than tubular 100 since it is offset from tubular 100 by collars 103, 104, and 105. Helical strake 102 and collars 103, 104, and 105 may be made integral to each other, i.e., they may be molded together as a single unit or integrally formed as a single unit such that they are inseparable. For example, each of collars 103, 104 and 105 may be attached to an inner surface of strake 102 facing the tubular 100 such that when strake 102 is positioned around tubular 100, collars 103, 104 and 105 are also positioned around tubular 100 as one unit. Alternatively, helical strake 102 and collars 103, 104 and 105 may be separate structures which are not molded together and can be removed from one another and tubular 100 separately. For example, strake 102 and collars 103, 104 and 105 may be formed separately or together as a single unit by an extrusion process, injection molding process, vacuum forming process or other similar process. If formed separately, collars 103, 104 and 105 may then be molded to the inner surface of strake 102, or not be molded and remain as separate units which can be separately positioned between tubulars 100 and 101 and strake 102.

Collars 103, 104, and 105 may be attached to tubular 100 by any suitable means including, but not limited to, bands, fasteners, chemical bonding, or use of other clamping devices. Collar halves 103A-103B 104A-104B and 105A-105B may be connected to each other by any suitable means including, but not limited to, bands, fasteners, hinges, chemical bonding, or use of other clamping devices. Adjacent tubular 101 may be inserted into any opening 106A-106D, 107A-107D and 108A-108D and utilize any number of openings. For example, tubular 101 can travel through one or more openings and be held in place by the interior surface of helical strake 102, when it is inserted around tubulars 100, 101 and collars 103, 104 and 105. Thus, collars 103, 104, and 105 may be used to keep helical strake 102 offset from the surface of tubular 100, restrain tubular 101, or both. Any number of tubular(s) 101 may be restrained by collars 103, 104, and 105. Other structures may also be offset from tubular 101, or restrained by collars 103, 104, and 105, such as anodes.

Again referring to FIG. 1A, collars 103, 104, and 105 and helical strake 102 may be made of any suitable geometry. In some embodiments, collars 103, 104 and 105 fully and entirely encircle tubular 100 but only partially encircle tubular 101. In other embodiments, collars 103, 104, and 105 and helical strake 102 may not fully encircle tubular 100 and/or may have holes or openings in them to allow for increased heat transfer or for improved cathodic protection of tubular 100 or tubular 101 or both. Openings 106A-106D, 107A-107D and 108A-108D may be of any suitable size and shape and may or may not be adjacent to the edge of collars 103, 104, and 105.

Again referring to FIG. 1A, collars 103, 104, and 105 and helical strake 102 may be made of any suitable material and may be made of the same or different materials, including but not limited to plastics, metals, fiberglass, composites, wood, and synthetics. Collars 103, 104, and 105 and helical strake 102 may have coatings applied to them for any reason including anti-fouling or for improved temperature performance or cathodic protection.

Figure 1B:
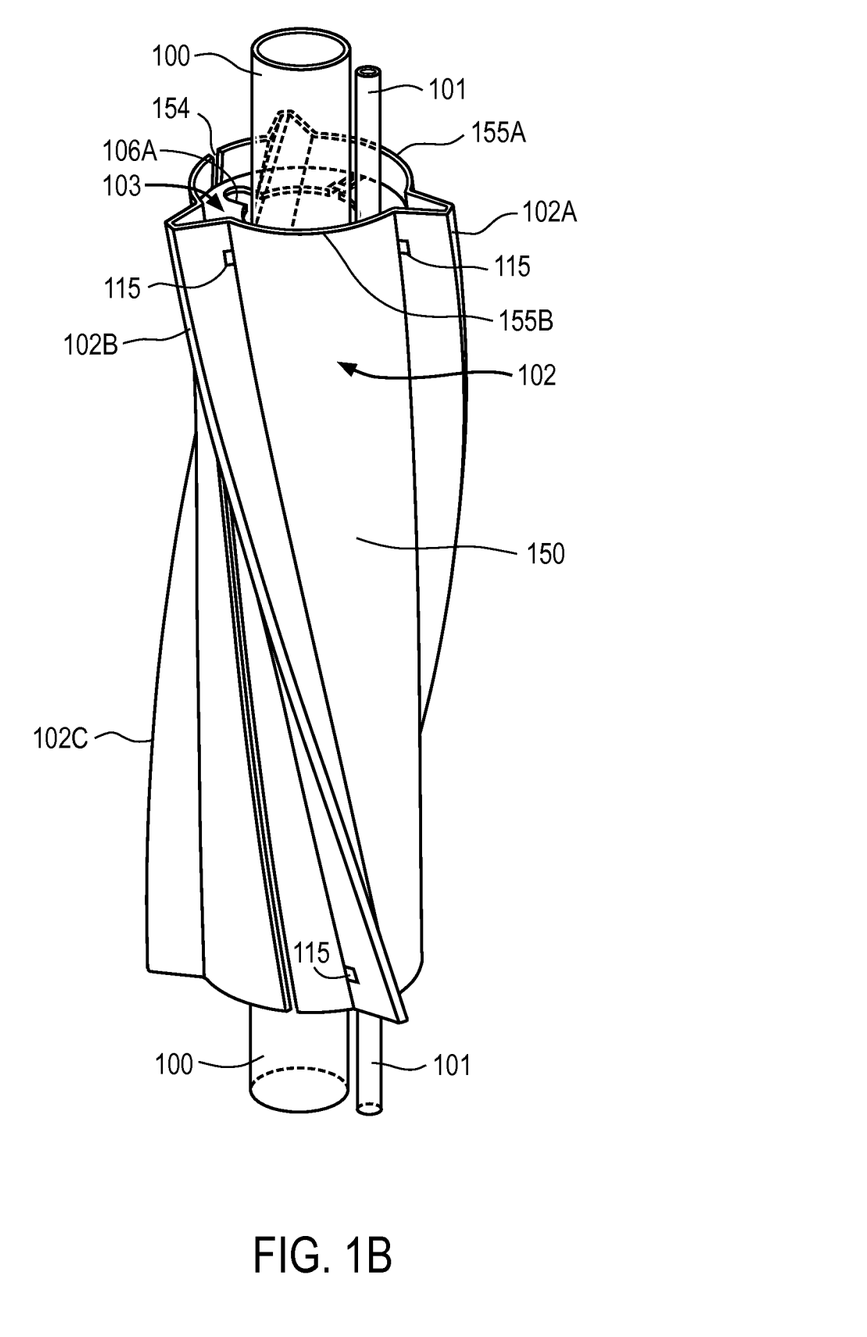
FIG. 1B is a perspective view of FIG. 1A with the VIV suppression device positioned around the collar.

Referring now to FIG. 1B, this figure is similar to FIG. 1A except that helical strake 102 having fins 102A-102C is shown placed around collar 103 (and also collars 104 and 105, but not visible from this view), which is placed around tubular 100. Optional tubular 101 is contained by opening 106B (and opening 106C, although not shown in this view)

in collar 103. Optional slots 115 may be formed between fins 102A-102C and shell 150 of helical strake 102 and be used for placing bands around helical strake 102 to tighten one or more sections of helical strake 102 against collar 103.

Figure 1C:
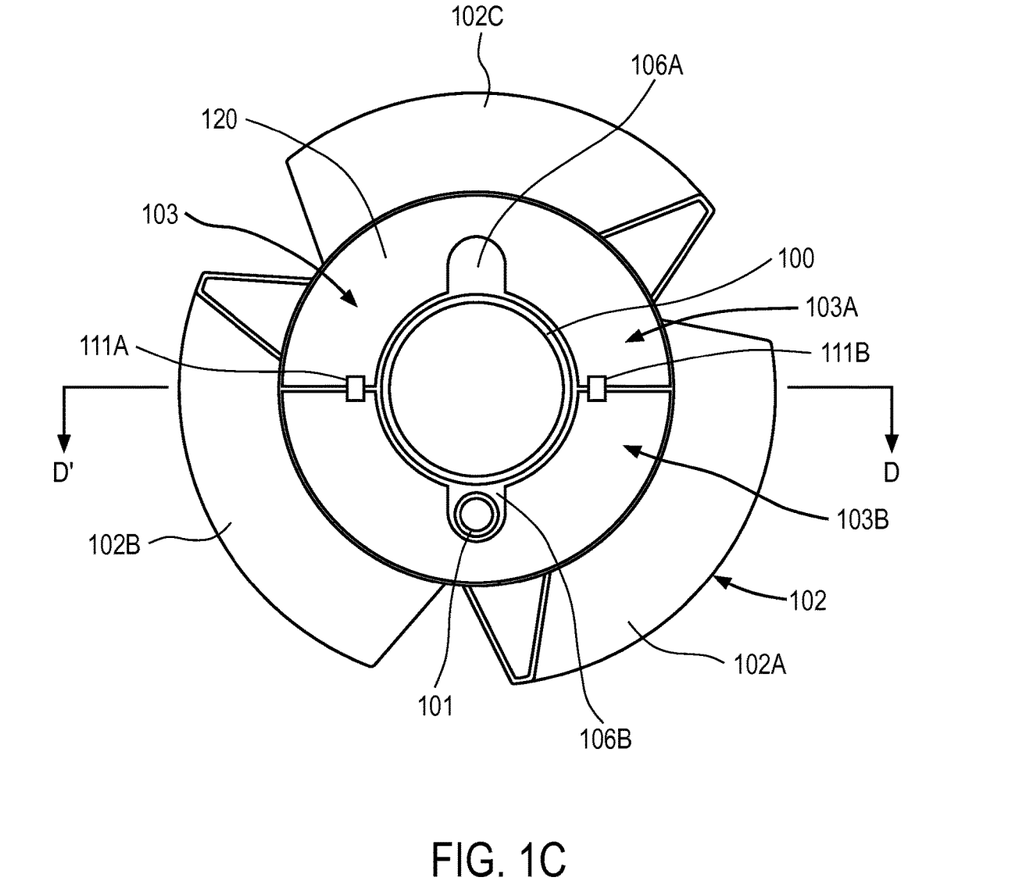
FIG. 1C is an end view of FIG. 1B.

Referring now to FIG. 1C, this figure shows a top end view of helical strake 102, having fins 102A, 102B, and 102C around collar 103 which consists of halves 103A and 103B. Collar halves 103A and 103B are connected by fasteners 111A and 111B. Collar half 103A has optional opening 106A while collar half 103B has optional opening 106B. Opening 106B contains tubular 101. Collar 103 is around tubular 100.

Still referring to FIG. 1C, the portion of collar 103 adjacent to tubular 100 will have a temperature close to that of tubular 100 but helical strake 102, which is spaced a distance from tubular 100 by spacer member 120, will have a temperature close to the surrounding fluid. This allows for helical strake 102 to be made of a plastic material that does not need to accommodate high temperatures. Openings 106A and 106B allow for one or more adjacent tubulars such as tubular 101 to have VIV suppression while keeping the tubular relatively restrained.

Again referring to FIG. 1C, any suitable fastening method may be used to attach collar half 103A and collar half 103B together. Fasteners 111A and 111B may consist of bands, bolts, nuts, welds, clamps, rivets, chemical bonding, or any suitable fastening method. Often bands, bolts, screws, or nuts will be used so that collar 103 may be tightened against tubular 100. Similarly, any suitable fastening method may be used to attach helical strake 102 to collar 103 but often bands, bolts, screws, or nuts will be used so that helical strake 102 may be tightened against collar 103. Collar 103, helical strake 102, and openings 106A-106B may be made of any suitable size and geometry in order to fulfill their functions as described herein.

Helical strake 102, collar 103, and fasteners 111A and 111B may be made of any suitable material, such as those previously discussed. In addition, it is to be understood that although only collar 103 is described in FIG. 1C, collars 104 and 105 are also positioned between helical strake 102 and tubular 100 and the description with respect to collar 103 similarly applies to collars 104 and 105.

Figure 1D:
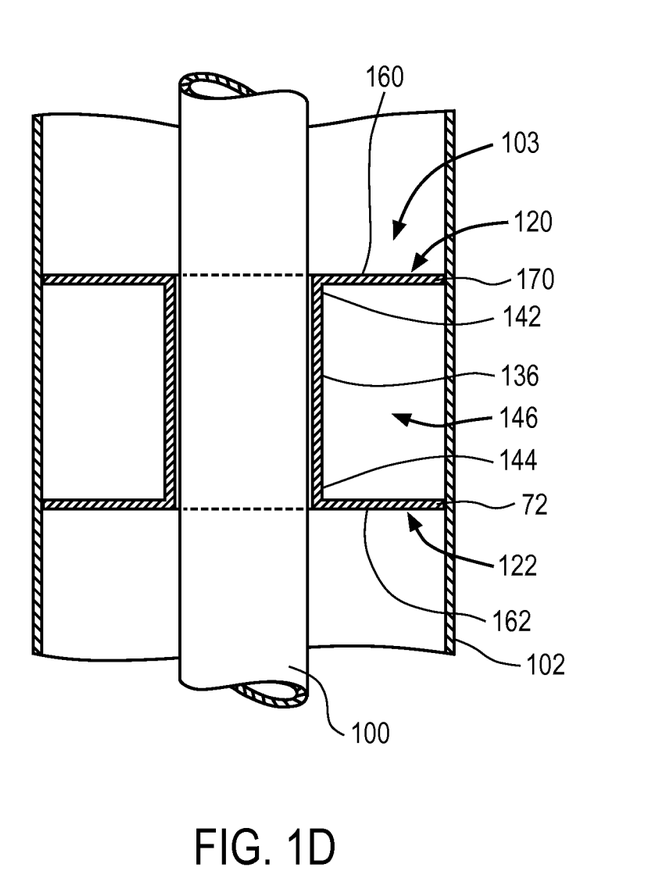
FIG. 1D is a cross-sectional side view along line D-D' of FIG. 1C.

FIG. 1D illustrates a cross-sectional side view of the collar of FIG. 1B along line D-D'. From this view, additional features of the collar can be seen more clearly. Representatively, from this view, it can be seen that collar 103 (as well as collars 104 and 105, although not shown), includes a cylindrical body portion 136 having a top spacer member 120 extending radially outward from top end 142 and a bottom spacer member 122 extending radially outward from its bottom end 144. In this aspect, a channel 146 is formed between body portion 136 and spacer members 120 and 122. The channel 146 may, in some embodiments, allow for a fluid or other material to flow between tubular 100 and helical strake 102. It can further be seen from this view that each of spacer members 120 and 122 has a substantially planar surface 160 and 162, respectively, which extends between tubular 100 and helical strake 102. The outer edge 170 and 172 of each of surfaces 160 and 162, respectively, contact and space helical strake 102 a distance from tubular 100. The previously discussed openings (e.g. openings 106A-106D) are formed through surfaces 160 and 162 such that they position the adjacent tubular (e.g. tubular 101) between tubular 100 and the inner surface of helical strake 102.

Figure 1E:
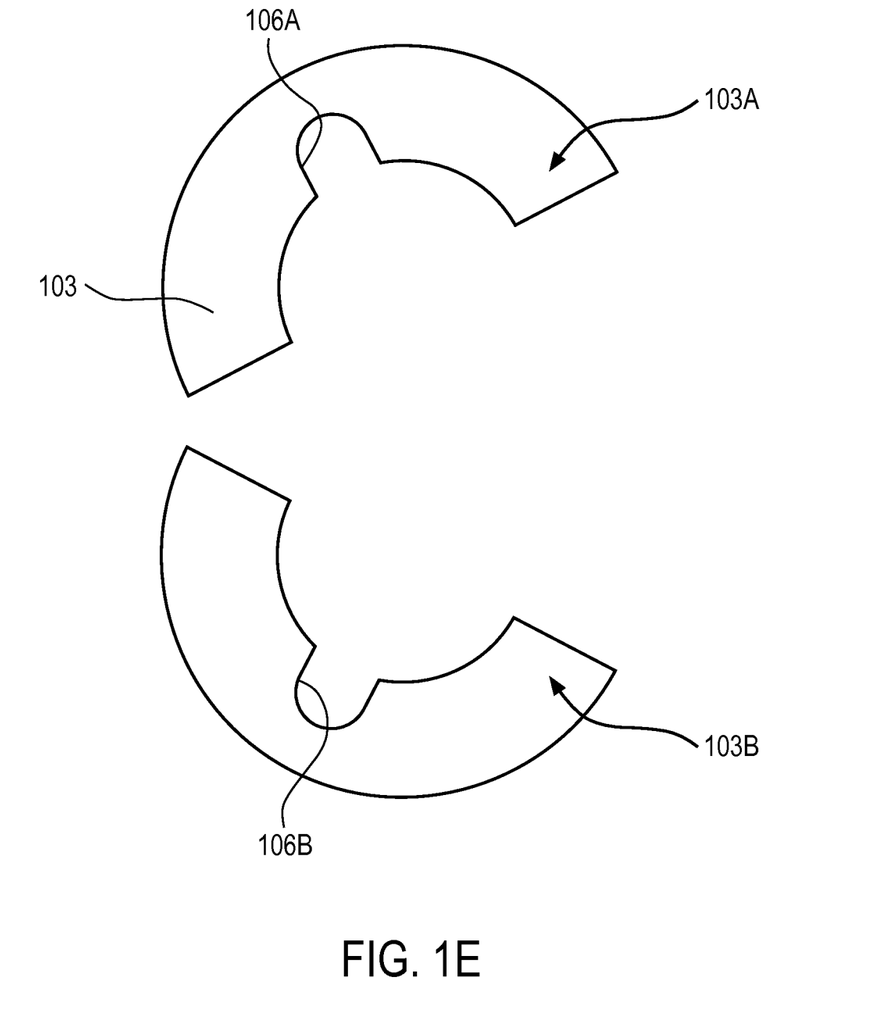
FIG. 1E is a top view of the collar of FIG. 1A in an open position.
Figure 1F:
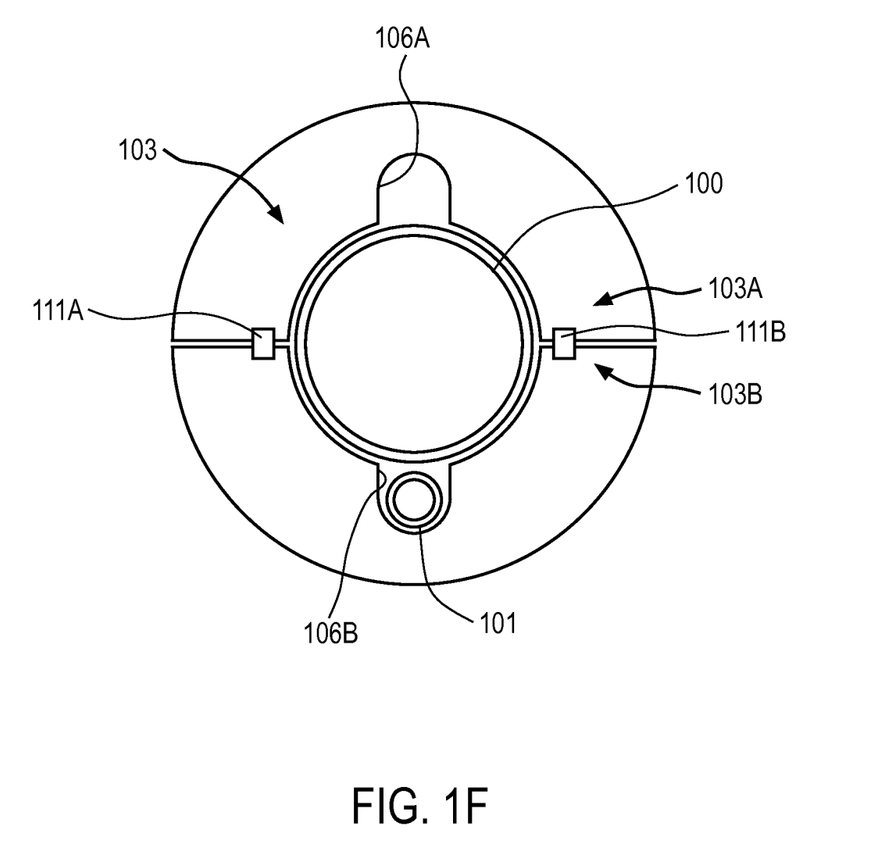
FIG. 1F is a top view of the collar of FIG. 1A in a closed position.

FIG. 1E shows a top view of collar 103 in the open configuration. From this view, it can be seen that halves 103A and 103B of collar 103 can be separated from one another to facilitate positioning of collar 103 around an underlying tubular (e.g. tubular 100) and adjacent tubular (e.g. tubular 101). Once in the open position as shown in FIG. 1E, halves 103A and 103B can be positioned around opposing sides of the tubular 100 and closed as shown in FIG. 1F. Once in the closed position, fasteners 111A-111B can be used to fasten halves 103A and 103B together and secure collar 103 around tubular 100. Alternatively, collar 103 (and collars 104 and 105) may be fastened around tubular 100 by fastening of strake 102 around tubular 100. The adjacent tubular 101 can be inserted into one of openings 106A or 106B depending upon which side of tubular 100 it is on, in this case tubular 101 is inserted into opening 106B.

Figure 1G:
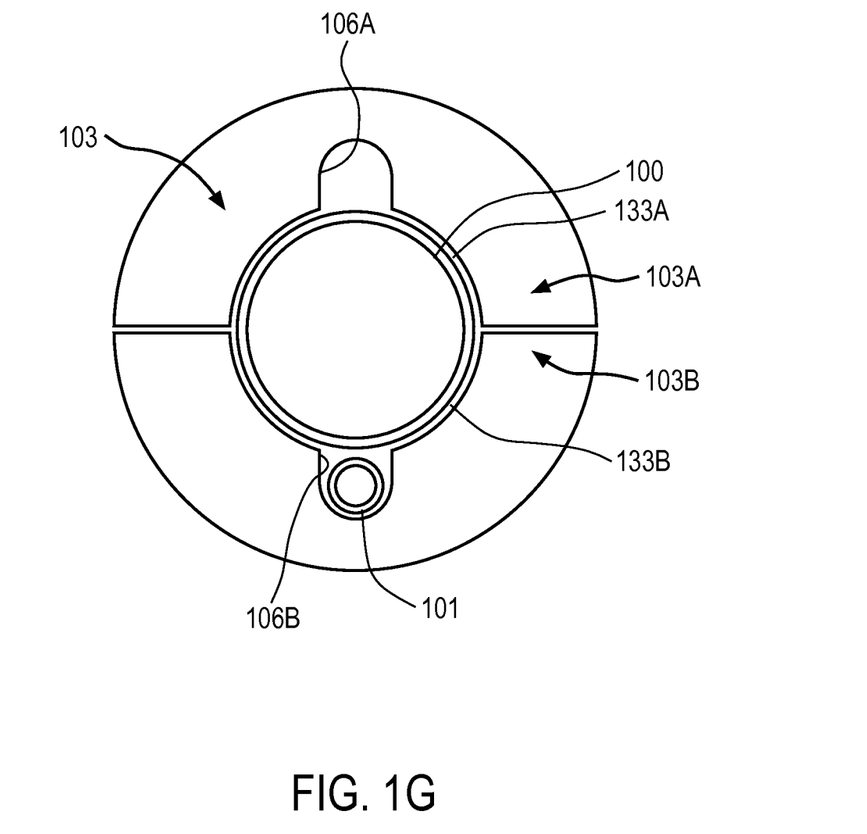
FIG. 1G is a top view of one embodiment of a collar including a liner for forming a space between a VIV suppression device.

Referring now to FIG. 1G, FIG. 1G is a top view of one embodiment of a collar including a liner for forming a space between a VIV suppression device. Collar 103 includes halves 103A and 103B, which are placed around tubular 100. Liner 133A is adjacent to the inner face of collar half 103A and liner 133B is adjacent to the inner face of collar half 103B. Optional tubular 101 is contained by opening 106B while optional opening 106A is shown empty in this figure. Liners 133A and 133B are optional and may be used as insulation, to act as a spring, or both. If acting as insulation, liners 133A and 133B are used to reduce the temperature of collar 103. If acting as a spring, liners 133A and 133B are used to allow collar 103 to accommodate changes in the diameter of tubular 100, for example due to hydrostatic pressure. Although not shown, collar 103 (and in some cases helical strake 102) may have holes in them to assist with cathodic protection or with heat transfer or both. In addition, although not shown, collars 104 and 105 may also have liners substantially similar to liners 133A and 133B.

Liners 133A and 133B may be made of any material and of any suitable thickness and may cover all, or part, of the inner face of collar halves 103A and 103B sufficient to provide an insulating or resilient layer between tubular 100 and a surrounding VIV suppression device (e.g. helical strake 102). Similar to collar 103, any number of liners may be used for collar 104 or 105 and not all collar sections must have a liner. Liners 133A and 133B may have holes or other openings in them to allow for enhanced heat transfer or to optimize their spring characteristics, or both. Liners 133A and 133B may be attached to collar halves 103A and 103B or may be installed on tubular 100 separately. The attachment of liners 133A and 133B to collar halves 103A and 103B and/or tubular 100 may be made by any suitable means including welding, chemical bonding, common mechanical means such as fasteners and rivets, and tape.

Liners 133A and 133B may be made of any suitable material including, but not limited to, elastomer, silicone, plastic, wood, metal, composite, and synthetics. Often more than one material may be used to form liners 133A and 133B. Liners 133A and 133B may be attached to collar halves 103A and 103B by any suitable means.

Figure 1H:
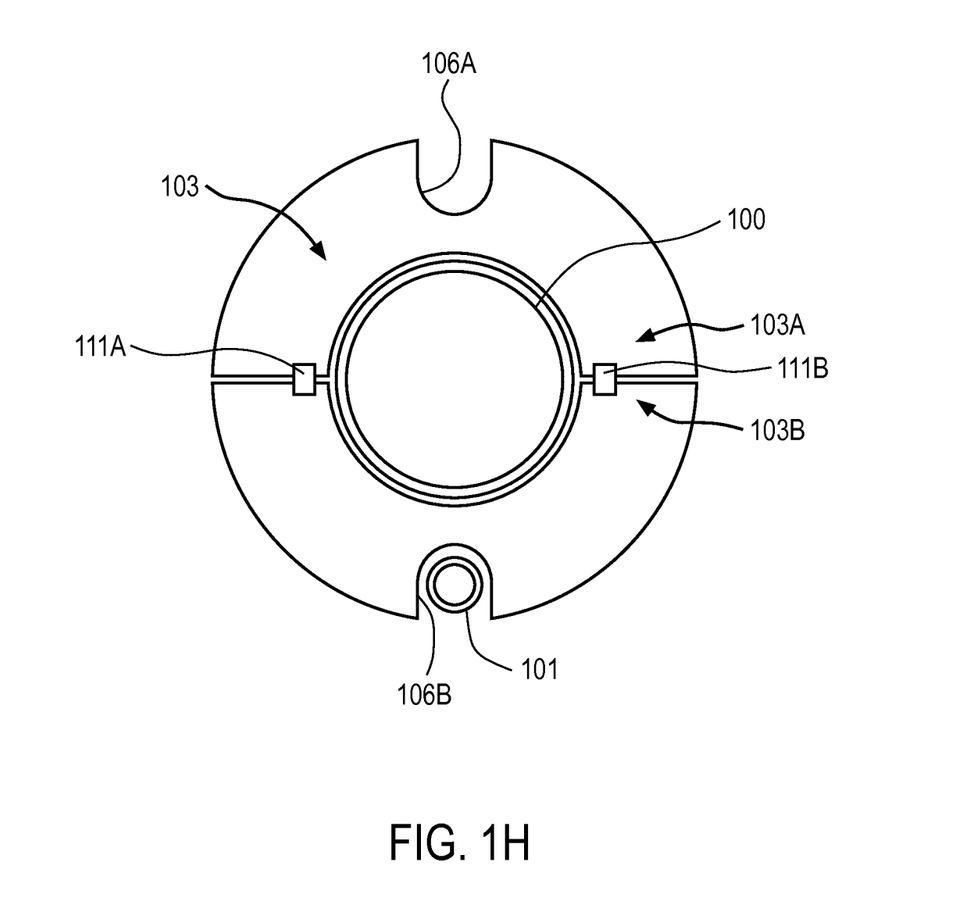
FIG. 1H is a top view of another embodiment of a collar in a closed position.

FIG. 1H is a top view of another embodiment of a collar in a closed position. Collar 103 is substantially the same as the collar disclosed in reference to FIG. 1F except that in this embodiment, openings 106A and 106B are formed along an outer edge of the spacer member (i.e. the edge facing away from tubular 100) such that the open side, within which tubular 101 is inserted, faces away from tubular 100.

Figure 2A:
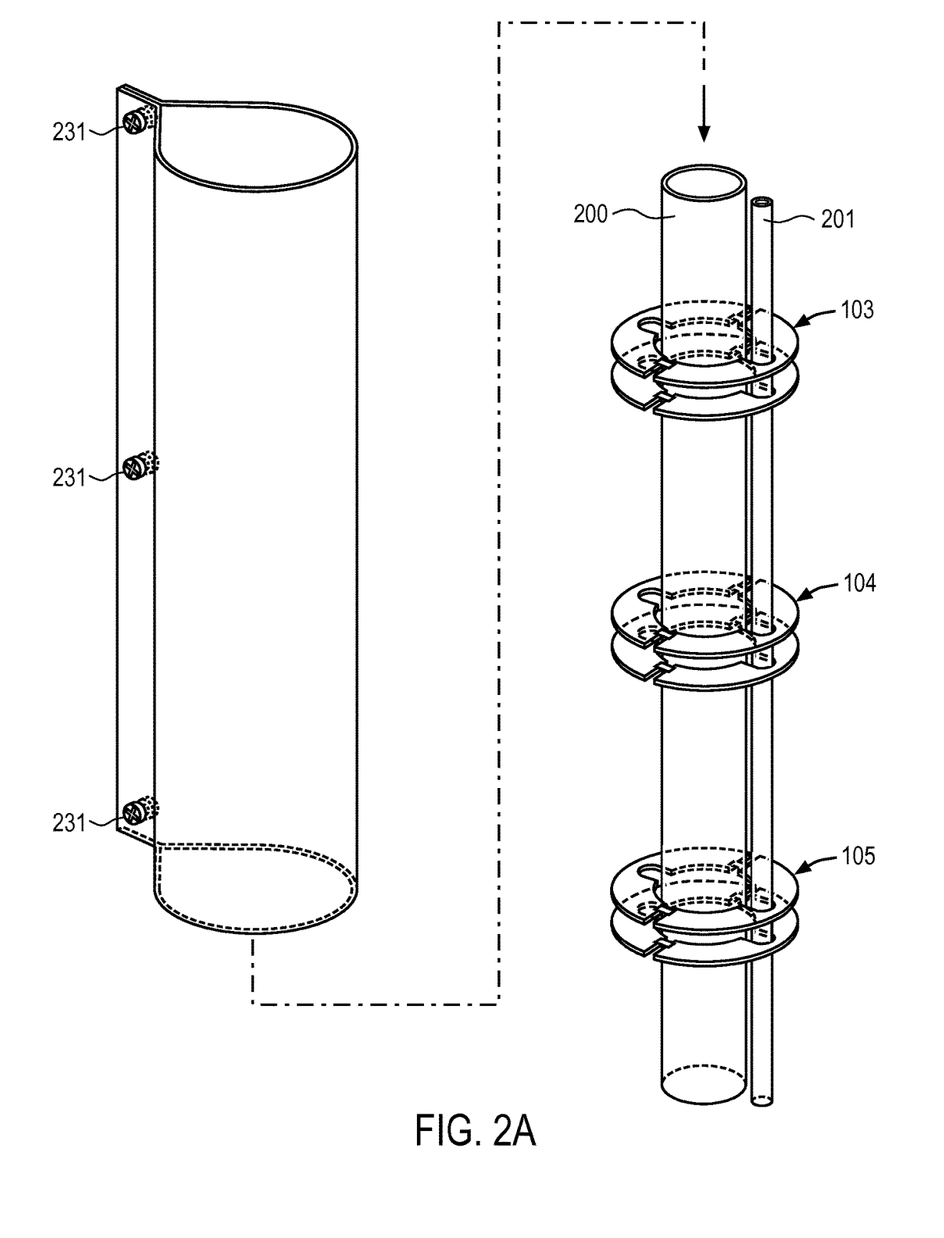
FIG. 2A is perspective view of a collar for forming a space between a VIV suppression device and a tubular.

Referring now to FIG. 2A, this figure is similar to FIG. 1A except that fairing 202 has been substituted for the helical strake. Any suppression device may be used instead of a helical strake or instead of fairing 202. Collars 103, 104 and 105 as previously discussed in reference to FIGS. 1A-1G are placed around tubular 200 and may accommodate one or more optional tubulars 201. Typically fairings such as fairing 202 will have fasteners 231 to hold them in place around a tubular. Fairing 202 may have other collars at its ends to keep it from sliding along the axis of tubular 100 or internal collars 103, 104 and 105 may serve this purpose.

Still referring to FIG. 2A, collars 103, 104 and 105 and fairing 202 may be made of any suitable geometry and this invention is not limited by a certain fairing shape, chord to thickness ratio, etc.

Again referring to FIG. 2A, collars 103, 104 and 105 and fairing 202 may be made of any suitable material. Often fairing 202 will be made of a common plastic.

Figure 2B:
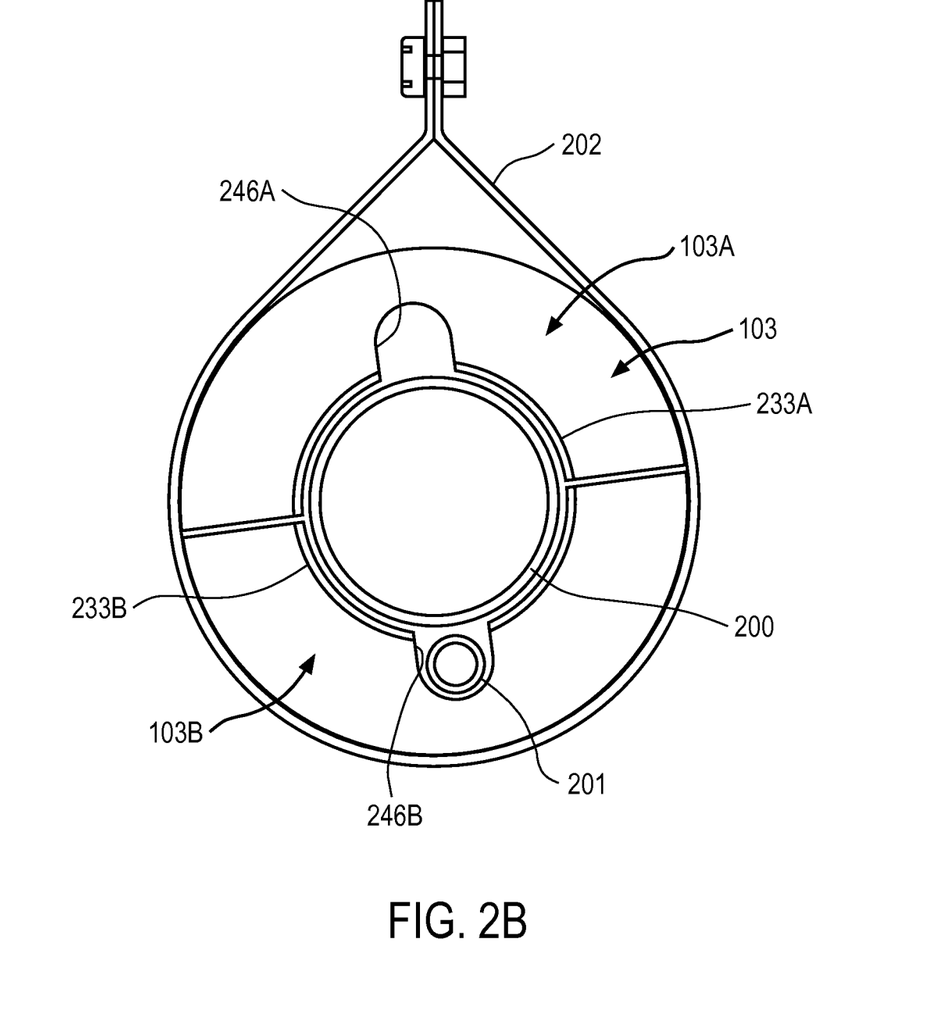
FIG. 2B is an end view of FIG. 2A.

Referring now to FIG. 2B, this figure is an end view of FIG. 2A and shows collar 203, consisting of two collar halves 203A and 203B, around tubular 200. Liners 233A and 233B are similar to the liners of FIG. 1G and include all of the liner characteristics presented in the FIG. 1G discussion. Optional opening 246B contains optional adjacent tubular 201 while optional opening 246A is empty. Fairing 202 surrounds collar 203.

Still referring to FIG. 2B, fairing 202 may, or may not, be free to rotate around collar 203. Often there will be an annulus between fairing 202 and collar 203 when the fairing 202 is free to rotate around collar 203. Similar to the system for a helical strake, this collar may be used to reduce the temperature of fairing 202 and/or allow the fairing to cover more than one tubular. Similar to the liners of FIG. 1G, liners 233A and 233B may be used to as insulation, as springs, or both. Liners 233A and 233B may have holes or other openings in them to allow for enhanced heat transfer or to optimize their spring characteristics, or both.

Figure 3:
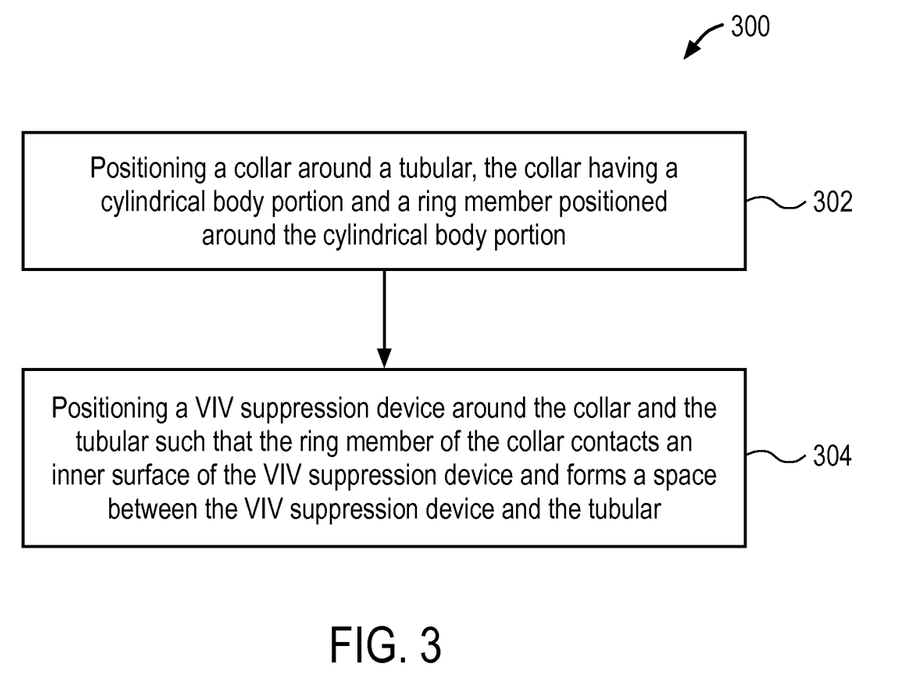
FIG. 3 is a flow diagram of one embodiment of a process for spacing a VIV suppression device from a tubular.

FIG. 3 is a flow diagram of one embodiment of a process for spacing a VIV suppression device from a tubular. Representatively, in one embodiment, process 300 includes positioning a collar (e.g. collar 103, 104 or 105) around a tubular (e.g. tubular 100), the collar including a cylindrical body portion and a ring member positioned around the cylindrical body portion (block 302). The collar(s) may be positioned around the tubular by opening the collar and then closing it around the tubular. Process 300 further includes positioning a VIV suppression device around the collar and the tubular such that the ring member of the collar contacts an inner surface of the VIV suppression device and forms a space between the VIV suppression device and the tubular (block 304). Positioning the VIV suppression device around the collar(s) and tubular may include opening the device and closing the device around the collars(s) and tubular in the case of a clam shell type configuration, or inserting the device over the end of the tubular, in the case of a device that does not open. The process may further include positioning a second tubular through an opening formed within the ring member such that the VIV suppression device is spaced from the first tubular and the second tubular and suppresses vortex induced vibration of the first tubular and the second tubular. The second tubular may be placed in the opening by positioning the second tubular near an outer edge of the opening and sliding it in a horizontal direction into the opening. In still further embodiments, a liner may be positioned between the collar and the tubular. The liner may provide an insulating layer between the tubular and the VIV suppression device to reduce heat transfer there between, or a resilient layer to accommodate an outer diameter change of the tubular as previously discussed.

In broad embodiment, the present invention consists of one or more collars that are used either to: offset a VIV suppression device from a tubular; allow a VIV suppression device to cover more than one tubular; or both.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

In the foregoing specification, the invention has been described with reference to specific embodiments thereof. It will, however, be evident that various modifications and changes can be made thereto without departing from the broader spirit and scope of the invention as set forth in the appended claims. For example, although the collars disclosed herein are described as being used to space helical strakes and fairings a distance from an underlying tubular, it is contemplated that they may be used to space any type of VIV suppression device from any type of support structure which may be subjected to vibrations. Representatively, the VIV suppression devices may further include a henning device, a cylindrical sleeve or other VIV suppression device having any size and shape, and the support structure may, in addition to a tubular, be a smoke stack, a pole or any other structure subjected to vibrations due to wind or water. The specification and drawings are, accordingly, to be regarded in an illustrative rather than a restrictive sense.

What is claimed is:

1. A collar for forming a space between a vortex induced vibration (VIV) suppression device and a tubular, the collar comprising:
   a cylindrical body portion dimensioned to encircle a tubular, the cylindrical body portion having a top end and a bottom end spaced a distance apart, and wherein the cylindrical body portion comprises an outer surface facing away from the tubular, and wherein the outer surface comprises a first outer diameter;
   a top spacer member extending radially outward from the top end of the cylindrical body portion and a bottom spacer member extending radially outward from the bottom end of the cylindrical body portion, each spacer member comprising a substantially planar surface having an inner edge facing toward the cylindrical body portion and an outer edge facing away from the cylindrical body portion, wherein the inner edge and the outer edge are spaced a distance apart and the outer edge defines a second outer diameter which is greater than the first outer diameter of the cylindrical body portion such that a channel is formed around the outer surface of the cylindrical body portion, and wherein the outer edge is dimensioned to contact an inner surface of a VIV suppression device positioned around the spacer members, and when the outer edge of the surface contacts the inner surface of the VIV suppression device, the channel is open to the inner surface of the VIV suppression device, and is positioned between the VIV suppression device and the tubular encircled by the cylindrical body portion; and a spacer slot formed in the substantially planar surface of each of the spacer members, wherein the spacer slot is formed along the inner edge of the substantially planar surface and comprises a radial width that is less than the entire radial distance between the inner edge and the outer edge of the substantially planar surface.

2. The collar of claim 1 wherein the spacer slot is dimensioned to receive an adjacent tubular and space the adjacent tubular from the VIV suppression device positioned around the adjacent tubular.

3. The collar of claim 1 wherein the spacer slot formed in the bottom spacer member is aligned with the spacer slot formed in the top spacer member.

4. The collar of claim 3 wherein the channel allows fluid to flow between the tubular around which the collar is positioned and the VIV suppression device positioned around the collar.

5. The collar of claim 1 wherein the cylindrical body portion comprises a first half and a second half that are pivotally attached to one another such that the cylindrical body portion is capable of being opened and closed around the tubular.

6. The collar of claim 1 wherein each spacer member is positioned around the entire circumference of the top end or the bottom end of the cylindrical body portion.

7. The collar of claim 1 wherein each spacer member is a substantially planar ring.

8. The collar of claim 1 wherein the spacer slot extends outwardly from the inner edge of each spacer member.

9. The collar of claim 1 further comprising:
a liner coupled to an inner surface of the cylindrical body portion.

10. A system for forming a space between a vortex induced vibration (VIV) suppression device and a tubular, the system comprising:
a collar comprising:
a cylindrical body portion forming a first opening dimensioned to receive a first tubular, the cylindrical body portion comprising an outer most surface facing away from the first tubular, and wherein the outer most surface comprises a first diameter, and
a first ring member and a second ring member formed around opposing axially aligned edges of the cylindrical body portion and spaced a distance from one another, the first ring member and the second ring member each having a surface extending radially outward from the opposing edges of the cylindrical body portion and in a direction away from the outer most surface of the cylindrical body portion such that the first ring member and the second ring member each have a second diameter that is greater than the first diameter of the cylindrical body portion, and each of the first ring member and the second ring member have a second opening formed through less than an entire width dimension of the radially outward extending surface of each of the first ring member and the second ring member, and wherein the second opening is dimensioned to receive a second tubular; and
a VIV suppression device positioned around the collar, wherein an outer edge of the surface of the first ring member and an outer edge of the surface of the second ring member is dimensioned to contact and space an inner surface of the VIV suppression device a distance from the first tubular and the second tubular positioned within the VIV suppression device.

11. The system of claim 10 wherein the first ring member is a top ring member formed around a top end of the cylindrical body portion,
and the second ring member is a bottom ring member formed around a bottom end of the cylindrical body portion, and wherein the second opening in each of the ring members are aligned and capable of receiving different portions of the same second tubular.

12. The system of claim 10 wherein the surface of the first ring member and the surface of the second ring member are substantially planar and encircle an entire circumference of the cylindrical body portion.

13. The system of claim 10 wherein the surface of the first ring member and the surface of the second ring member further comprise a third opening dimensioned to receive a third tubular.

14. The system of claim 10 wherein the collar and the VIV suppression device are integrally formed as a single unit that encircles an entire outer circumference of the first tubular.

15. The system of claim 10 further comprising: a resilient liner coupled to an inner surface of the cylindrical body portion, wherein the resilient liner is configured to accommodate changes in an outer diameter of the first tubular around which the cylindrical body portion is positioned.

16. The system of claim 10 further comprising: an insulating liner coupled to an inner surface of the cylindrical body portion, wherein the insulating liner is configured to reduce heat transfer between the first tubular and the VIV suppression device positioned around the first tubular.

17. The system of claim 10 wherein the collar and the VIV suppression device are integrally formed as a single unit.

18. A method of spacing a vortex induced vibration (VIV) suppression device from a tubular, the method comprising:
positioning a collar around a first tubular, the collar having a cylindrical body portion and a first ring member and a second ring member positioned around a top end and a bottom end, respectively, of the cylindrical body portion, wherein at least one of the first ring member or the second ring member has a greater diameter than the cylindrical body portion, and the first ring member and the second ring member in combination with the collar form a channel which allows for fluid flow around an outer surface of the cylindrical body portion; positioning a second tubular through an opening formed within the first ring member and an opening formed within the second ring member and
positioning a VIV suppression device around the collar, the first tubular and the second tubular, wherein the channel is open to an inner surface of the VIV suppression device and the first ring member and the second ring member contact the inner surface of the VIV suppression device to form a space between the VIV suppression device and the first tubular and the second tubular.

19. The method of claim 18 further comprising:

positioning a liner between the collar and the tubular, wherein the liner (1) provides an insulating layer between the tubular and the VIV suppression device to reduce heat transfer there between, or (2) provides a resilient layer to accommodate an outer diameter change of the tubular.

* * * * *